(12) United States Patent
Poursohi et al.

(10) Patent No.: US 9,787,908 B1
(45) Date of Patent: Oct. 10, 2017

(54) FRAME SYNCHRONIZED ROOM LIGHTING

(71) Applicant: Google Inc., Mountain View, CA (US)

(72) Inventors: Arshan Poursohi, Berkeley, CA (US);
Daniel Aden, Redwood City, CA (US);
Matthew Amacker, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/200,139

(22) Filed: Jul. 1, 2016

(51) Int. Cl.
*H04N 5/222* (2006.01)
*H04N 5/235* (2006.01)
*H04N 5/225* (2006.01)

(52) U.S. Cl.
CPC ......... *H04N 5/2354* (2013.01); *H04N 5/2256* (2013.01); *H04N 5/2351* (2013.01)

(58) Field of Classification Search
None
See application file for complete search history.

(56) References Cited

U.S. PATENT DOCUMENTS

| | | | |
|---|---|---|---|
| 5,959,668 A | 9/1999 | Cryder et al. | |
| 7,859,563 B2 | 12/2010 | Quine | |
| 8,408,464 B2 | 4/2013 | Zhu et al. | |
| 8,985,456 B2 | 3/2015 | Zhu et al. | |
| 2009/0009628 A1 | 1/2009 | Janicek | |

FOREIGN PATENT DOCUMENTS

| | | |
|---|---|---|
| CN | 201083935 | 7/2008 |
| WO | 9118475 A1 | 11/1991 |
| WO | 9119382 A1 | 12/1991 |

*Primary Examiner* — Stephen Coleman
(74) *Attorney, Agent, or Firm* — McDonnell, Boehnen, Hulbert & Berghoff LLP

(57) ABSTRACT

Systems are provided to facilitate imaging of a person or other target in an environment by providing modulated illumination to the target and to other aspects of the environment. Modulated illumination is provided to the target such that the target receives more illumination when a camera is capturing images of the target than during other periods of time. Modulated illumination is provided to background objects or other portions of the environment of the target such that the background or other non-target elements of the environment receive less illumination when the camera is capturing images than during other periods of time. In this way, imaging of a target can be improved by increasing effective illumination of the target while decreasing glare and other effects of illumination of background objects. The illumination can be modulated at a sufficiently high frequency that the illumination appears, to the human eye, to be substantially constant.

20 Claims, 6 Drawing Sheets

FRAME SYNCHRONIZED ROOM LIGHTING

BACKGROUND

Lighting may be provided, from one or more light sources, to facilitate the generation of one or more images (e.g., of a plurality of images, as for a video recording) of an environment of interest. Such lighting can be provided from a device that is also configured to generate the images (e.g., a flash of a camera, an annular illuminator disposed around the aperture or lens of a camera) or could be provided from standalone devices (e.g., from overhead lighting, from light emitters of a light box, from an off-camera flash or diffuser).

SUMMARY

Some embodiments of the present disclosure provide a method including: (i) capturing, using a camera, a plurality of images of an environment, wherein the images are captured during respective capture periods, wherein sequential capture periods are separated by delay periods, and wherein the captured images are of a target area that is disposed within the environment; (ii) providing, from a first light emitter, first modulated illumination to a first portion of the environment, wherein the target area is exposed to the first modulated illumination, wherein the first modulated illumination has a first intensity during the capture periods that is greater than a first mean intensity of illumination emitted by the first light emitter across the capture and delay periods; and (iii) providing, from a second light emitter, second modulated illumination to a second portion of the environment, wherein the second modulated illumination has a second intensity during the capture periods that is less than a second mean intensity of illumination emitted by the second light emitter across the capture and delay periods.

Some embodiments of the present disclosure provide a method including: (i) transmitting, from a computing device, instructions to a camera to capture a plurality of images of an environment, wherein the images are captured during respective capture periods, wherein sequential capture periods are separated by delay periods, and wherein the captured images include a target area that is disposed within the environment; (ii) transmitting, from the computing device, instructions to a first light emitter to provide first modulated illumination to a first portion of the environment, wherein the target area is exposed to the first modulated illumination, wherein the first modulated illumination has a first intensity during the capture periods that is greater than a first mean intensity of illumination emitted by the first light emitter across the capture and delay periods; and (iii) transmitting, from the computing device, instructions to a second light emitter to provide second modulated illumination to a second portion of the environment, wherein the second modulated illumination has a second intensity during the capture periods that is less than a second mean intensity of illumination emitted by the second light emitter across the capture and delay periods.

Some embodiments of the present disclosure provide a system including: (i) a camera configured to capture a plurality of images of an environment, wherein the images are captured during respective capture periods, wherein sequential capture periods are separated by delay periods, and wherein the captured images include a target area that is disposed within the environment; (ii) a first light emitter configured to provide first modulated illumination to a first portion of the environment, wherein the target area is exposed to the first modulated illumination, wherein the first modulated illumination has a first intensity during the capture periods that is greater than a first mean intensity of illumination emitted by the first light emitter across the capture and delay periods; and (iii) a second light emitter configured to provide second modulated illumination to a second portion of the environment, wherein the second modulated illumination has a second intensity during the capture periods that is less than a second mean intensity of illumination emitted by the second light emitter across the capture and delay periods.

These as well as other aspects, advantages, and alternatives, will become apparent to those of ordinary skill in the art by reading the following detailed description, with reference where appropriate to the accompanying drawings.

DETAILED DESCRIPTION

Figure 1A:
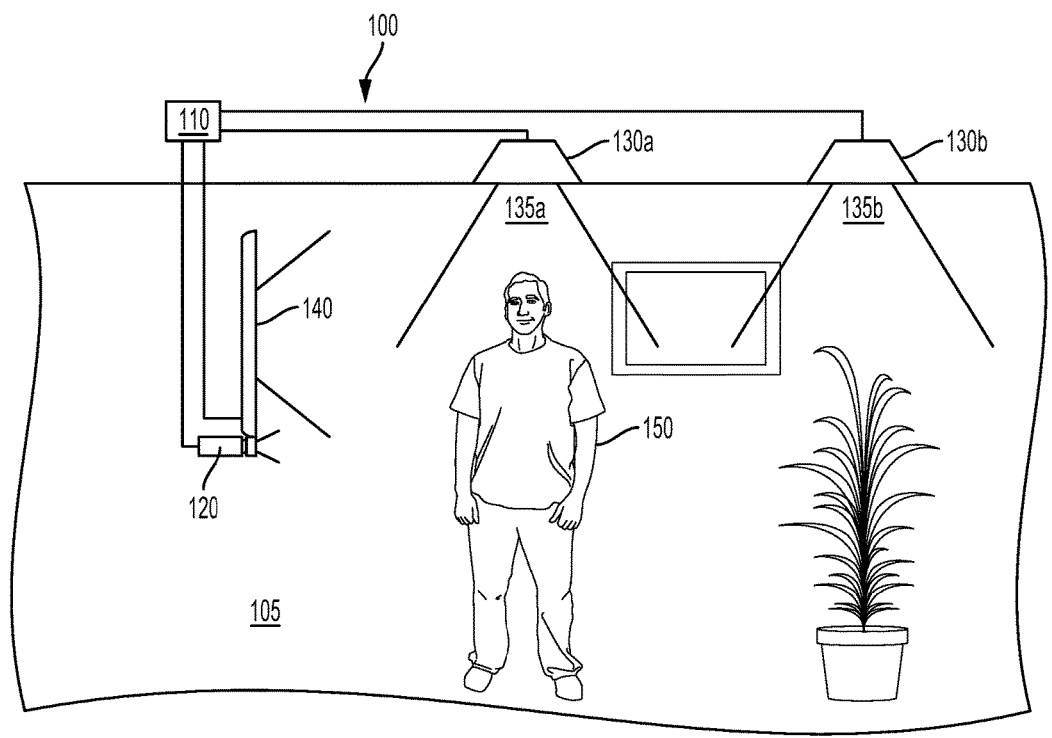
FIG. 1A is diagram of an example environment, portions of which are being illumination by light emitters.

In the following detailed description, reference is made to the accompanying figures, which form a part hereof. The illustrative embodiments described in the detailed description, figures, and claims are not meant to be limiting. Other embodiments may be utilized, and other changes may be made, without departing from the scope of the subject matter presented herein. In some examples herein, illumination is describes as alternating between 'on' and 'off' levels of intensity. 'On' and 'off' levels of intensity could describe levels of intensity that differ with respect to each other but that are both non-zero. Alternatively, an 'off' level of intensity could correspond to providing substantially no illumination. Aspects of the present disclosure, as generally described herein, and illustrated in the figures, can be arranged, substituted, combined, separated, and designed in a wide variety of different configurations.

I. OVERVIEW

A variety of applications include the use of a camera to take pictures or video of an environment. These applications can include videoconferencing, the recording of video to record a meeting, performance, speech, personal event, or other applications. However, providing adequate lighting to facilitate such imaging can be difficult. In many locations where video may be taken (e.g., conference rooms, offices, homes), lighting is provided by overhead light sources or other means. A target area of a camera may be poorly lit, may move around, may change, or may otherwise be difficult to properly light. For example, different people could be the focus of a videoconference at different points in time. Person-facing light emitters (e.g., light emitters disposed on a camera) may be used to light a person or other target directly, but the presence of such additional illumination directed at the face of a person may be unpleasant and/or intrusive. A target may be backlit by light sources in an environment (e.g., in examples wherein a target is viewing a display while being imaged from the direction of the display) and/or non-target objects in the background may be more brightly lit and/or may generate glare, further degrading images captured of the target.

Modulated illumination could be provided to different portions of an environment to increase or decrease the amount of illumination received by the portions of the environment when a camera is capturing images of the environment. Such modulated illumination could vary its intensity in time with the operation of the camera in order to illuminate a target area of a camera when the camera is capturing images and/or to reduce the illumination of non-target areas of the camera when the camera is capturing images. For example, to increase the brightness of a target area (e.g., an area including a person) as captured by a camera in a plurality of images (e.g., a plurality of images used to generate a video stream), the intensity of light provided to the target area during image capture periods could be increased relative to a mean intensity of illumination provided to the target area across capture and non-capture periods.

If the modulation of the illumination is provided at a sufficiently high frequency (e.g., at 60 Hertz, or at some frequency less than 60 Hertz), the brightness of the target area in the captured images could be increased without causing an increase in the intensity of the provided illumination as perceived by a person (e.g., by a person who is within the target area of the camera). This could include increasing the intensity of the modulated illumination during the capture periods and decreasing the intensity of the modulated illumination during non-capture periods such that the mean intensity, over time, of the modulated illumination remains the same. Conversely, the brightness of non-target contents of the environment, as represented in images captured by the camera, could be decreased by decreasing the intensity of light provided to the non-target contents of the environment during the capture periods relative to a mean intensity of illumination provided to the non-target contents across capture and non-capture periods.

Such modulated illumination could be provided to different portions of an environment in a variety of ways. In some examples, the illumination could be provided by devices for providing general illumination to an area, e.g., ceiling-mounted lights, wall-mounted lights, lamps, or other sources. The light sources could include light-emitting diodes (LEDs), fluorescent elements, or other light-emitting components that can be operated to provide modulated illumination to portions of an environment. A display (e.g., a display of a videoconferencing system, a display of a cellphone) could be operated to provide modulated illumination to a person or to some other target area. A light source could be operated to provide modulated illumination by providing light having an intensity that varies continuously across a range, that switches between a number of discrete levels, or that switches between 'on' and 'off' states. The intensity of the modulated illumination could include a plurality of pulses of illumination that have a specified frequency, duty cycle, pulse width, pulse timing, or other specified properties to effect light of an environment in combination with image capture of the environment as described herein.

A variety of cameras, light-emitters, or other components could be operated to provide modulated illumination to an environment and to capture images of the environment in time with the provided illumination. In some examples, one or more cameras and/or light-emitters could be part of a system that includes a controller or other elements configured to operate the camera(s) and light emitter(s) to operate as described herein. Alternatively, the camera(s) and/or light-emitter(s) could be part of a home automation system, could include respective controllers and communications elements, or could be otherwise configured to receive instructions from a server or other computing device and/or to communicate with each other to operate as described herein. This could include receiving instructions from a master system (e.g., a server that is configured to facilitate videoconferencing). Alternatively, the camera(s) and/or light emitter(s) could operate to synchronize with each other or to otherwise operate in combination. This could include forming an ad-hoc network and/or one of the elements (e.g., a camera) acting as a master to light emitters or other elements. Alternatively, modulated illumination could be provided in an environment and a camera could operate to detect the modulated illumination and to time image capture relative to the timing of modulation of the illumination (e.g., to capture images when the intensity of the modulated illumination is increased).

It should be understood that the above embodiments, and other embodiments described herein, are provided for explanatory purposes, and are not intended to be limiting.

II. EXAMPLE MODULATED ILLUMINATION OF AN ENVIRONMENT

A variety of systems and methods may be employed to provide, to one or more portions of an environment, modulated illumination to improve video and/or image capture of a person or other target area in the environment. Modulated illumination could be provided to a target area such that the intensity of the illumination is greater during periods of time when a camera is capturing images of the target area (such periods of image capture by a camera are referred to herein as capture periods) than a mean intensity of the modulated illumination across periods when the camera is capturing images and periods when the camera is not capturing images. By capturing images during periods of time when the intensity of the illumination is increased, the brightness of the target area in the captured images may be increased without increasing the mean intensity of the provided illumination. Further, the brightness of background objects or other non-target areas in the images may be reduced by providing additional modulated illumination to the non-target areas. This could be accomplished by the additional modulated illumination having a decreased intensity when the camera is capturing images. Modulated illumination could be provided by overhead or wall lighting fixtures, spot lights, displays, light emitters disposed proximate to a camera, or other light-emitting devices or systems.

Figure 1B:
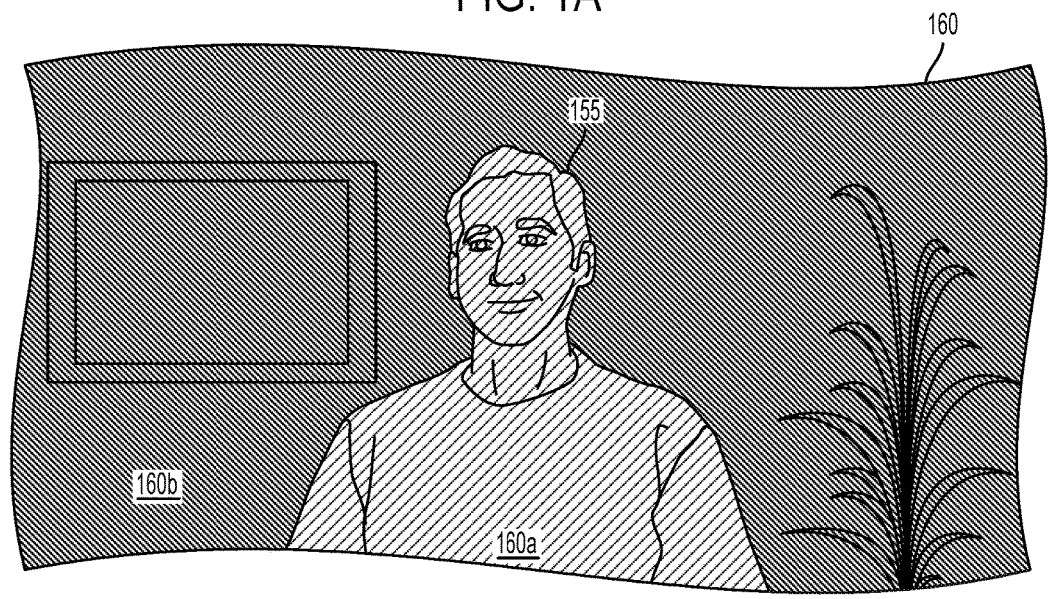
FIG. 1B is an example image of the environment of FIG. 1A

In an example, modulated illumination could be provided to improve video capture of a person engaged in a videoconference by increasing the intensity of modulated illumination provided to the person (or to some other target area) when a camera is capturing images of the person and decreasing the intensity of modulated illumination provided to background objects when the camera is capturing images. FIGS. 1A and 1B provide an illustration of such an example.

FIG. 1A illustrates an environment 105 that includes a person 150 that is the target of a camera 120. The camera 120 is configured to capture images of the environment 105; these images may include images of the person 150 and/or other elements in the environment (e.g., a plant, a wall hanging, walls, doors, other participants in a videoconference). A display 140 is also located in the environment 105 and may be operated to provide images or video, e.g., video of a participant in a videoconference. First 130a and second 130b light emitters are providing first 135a and second 135b illumination to respective portions of the environment 105. As shown, the first light emitter 130a is providing first illumination 135a to a portion of the environment 105 that includes a target area (i.e., the person 150).

FIG. 1B shows an example image 160 of the environment 105 that could be captured using the camera 120. The example image 160 includes an image of the person 155. Different regions of the image 160 could represent different portions of the environment 105 that are being illuminated by respective different light emitters 130a, 130b. In FIG. 1B, a first portion 160a of the image 160 (that includes the image of the person 155) corresponds to a first portion of the environment 105 that is exposed to first illumination 135a from the first light emitter 130a. A second portion 160b of the image 160b corresponds to background elements of the environment 105 that are exposed to second illumination 135b from the second light emitter 130b. By controlling the pattern, timing, or other properties of modulated illumination provided by the light emitters 130a, 130b the brightness or other properties of the first 160a and second 160b portions of the image 160 captured using the camera 120 could be controlled.

For example, the first 130a and second 130b light emitters could be operated (e.g., by the controller 110) to increase the brightness of the person 150 in captured images of the environment 105 while decreasing the brightness of background objects (e.g., walls, plants, wall hangings). This could include using the first light emitter 130a to provide a greater intensity of illumination 135a during capture periods when the camera 120 captures images (e.g., 160) than during other periods of time (e.g., delay periods between such capture periods). Operating the first light emitter 130a in this way could cause the brightness of the person 155 in the first portion 160a of the image 160 to be increased while allowing a mean intensity of the first illumination 135a to remain the same. Conversely, the second light emitter 130a could be operated such that the intensity of the second illumination 135b is less during the capture periods than during other periods of time to cause the brightness of background elements in the second portion 160b of the image 160 to be decreased while allowing a mean intensity of the second illumination 135b to remain the same. Further, the mean intensity of illumination provided by the light emitters 130a 130b could be substantially the same (e.g., within 15% of one another) such that most humans will be unlikely to perceive a difference in the illumination provided by the different light emitters 130a, 130b.

FIG. 1A shows a controller 110 that is configured to operate the camera 120, display 140, light emitters 130a, 130b, and/or other devices or systems (not shown). The controller 110 could be configured as a server, a computer or element(s) of a computer or computing device, or some other device or system and could be located proximate to the environment 105. Alternatively, the controller 110 could be located at a distance from the environment 105 and could communicate with the light emitters 130a, 130b, camera 120, display 140, and/or other devices. This communication could include transmitting instructions to the other devices to perform some operations. For example, the controller 110 could transmit instructions (e.g., via wireless signals, via the internet or some other network) to the light emitters 130a, 130b to provide modulated illumination according to a specified timing or pattern and/or transmit instructions to the camera 120 to capture a plurality of images of the environment 105 during respective capture periods. In some examples, the controller 110, camera 120, light emitters 130a, 130b, display 140, and other components could form part of a system 100 configured to operate as described herein. The operations of such a system 100 could be provided by a program or application running on a server or in a cloud computing system. Such systems could be configured to execute a computer-readable medium that stores instructions for controlling light emitters, cameras, displays, or other systems, communicating with such systems, or for performing some other operations described herein.

Transmitting instructions to light emitters and/or cameras to provide modulated illumination, to capture images, or to perform some other operations could be accomplished in a variety of ways. In some examples, transmitting such instructions could include transmitting information describing an absolute or relative timing of pulses of illumination and/or capture periods for one or more images. The instructions could specify the timing of particular capture periods and/or periods of illumination or could specify a frequency, phase, or other information about recurring capture periods. Transmitting such instructions could include transmitting the instructions once (e.g., transmitting commands to begin providing modulated illumination and/or to capture images) or could include transmitting instructions multiple times (e.g., generating a transmission for each capture period or for a set of capture periods). Transmitting instructions to light emitters and/or cameras could include transmitting timing information sufficient to synchronize the operation of multiple systems (e.g., via clock synchronization, by transmitting timing pulses). Additionally or alternatively, transmitted instructions could reference timing information that is accessible by multiple different (e.g., absolute time provided by the global positioning system or a radio clock).

The use of a controller 110 to operate, send instructions to, or otherwise control or organize the operations of cameras, light emitters, or other systems is intended as a non-limiting example of a system configured to provide the functionality described herein. In some examples, a camera, light emitters, display, or other components could be configured to form an ad hoc network or to otherwise communicate with each other (e.g., via wireless signals, via the internet or some other network) to provide modulated illumination and the capture images of an environment. This could include one of the elements (e.g., the camera) acting as a master to transmit instructions, timing data, or other information to other elements (e.g., light emitters). Additionally or alternatively, one or more light emitters could provide modulated illumination and another device could detect the pattern, timing, or other properties of the modulated illumination and operate accordingly. For example, a cellphone or other image-capturing device could detect that it is being exposed to modulated illumination (e.g., using a camera or other light-sensitive elements of the device) and could operate to capture images during periods of time when the intensity of the modulated illumination is greater.

The controller 110 could operate the display 140 to provide images, video, or other information to individuals or systems in the environment 105. In some examples, the intensity of light emitted by the display 140 could be controlled to provide modulated illumination. For example, the intensity of light provided by the display 140 (e.g., in the form of images, or in the form of a solid white 'image' presented in sequence with other images) could be modulated to provide a greater intensity of illumination to the person 150 when the camera 120 is capturing images of the person 150. The camera 120 could be operated to generate a plurality of images of the person 150 and/or the environment 105 and such images could be used to generate a video stream of a target area in the environment 105. For example, the images captured using the camera 120 could be compressed, postprocessed, downsampled, or otherwise used to generate a video stream that could be transmitted to another system to facilitate videoconferencing, broadcast or recording of a presentation or speech, or to facilitate some other applications. The controller 110 could provide other functionality, e.g., to transmit and/or receive video and audio streams as part of a videoconference.

Illumination provided by a light emitter could be modulated over time in a variety of ways to provide the functionality described herein. The intensity of the illumination provided by a particular light emitter could vary continuously across a range of intensities or could be varied between a set of discrete intensity values. For example, the light emitter could be operated to provide intermittent illumination that is 'on' during capture periods when a camera is capturing images of an environment and 'off' during delay periods between such capture periods. The pattern of modulation of such illumination could repeat at a specified frequency (e.g., at a frame rate of images captured by a camera) or could vary according to some other pattern. The intensity of modulated illumination could vary over time according to pulses (e.g., square pulses, triangular pulses, raised sinusoid pulses), sinusoids, or some other pattern. The pulse width, duty cycle, intensity, or other properties of the modulated illumination could be specified to provide increased (or decreased) illumination intensity during capture periods of a camera while also providing a mean intensity of illumination corresponding to a specified mean illumination level (e.g., a mean intensity controlled by a dimmer switch or other controls or systems).

Figure 2A:
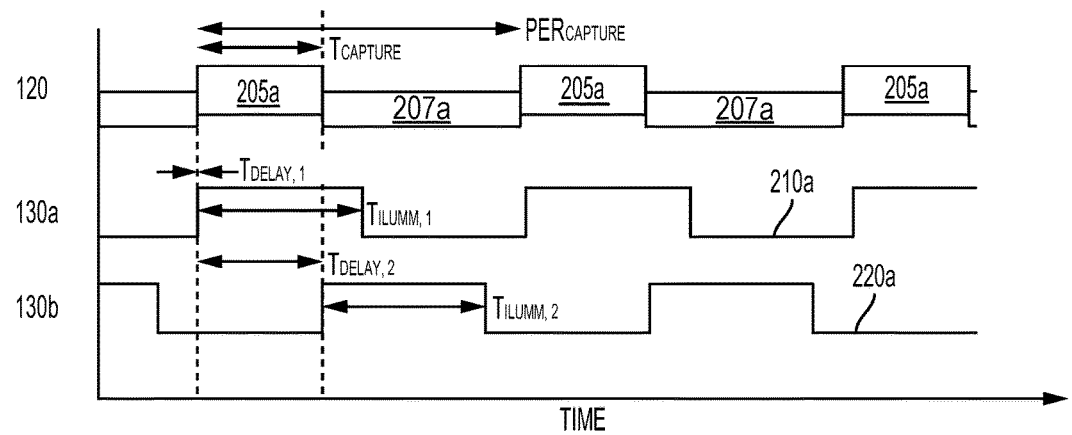
FIG. 2A is an example timing diagram of operation of a camera and two light emitters.

FIG. 2A shows a timing diagram of an example operation of a camera and two light emitters (e.g., the camera 120 and light emitters 130a, 130b shown in FIG. 1A) to provide the functionality described herein. FIG. 2A illustrates the timing of capture periods 205a of a camera during which the camera captures images. This could include capturing a single image during each capture period 205a, multiple images during each capture period 205a, a single image across multiple capture periods 205a (e.g., by processing images generated during a number of different capture periods, by operating a light-sensitive element of the camera to integrate light received during multiple different capture periods 205a), or capturing a plurality of images according to some other scheme. FIG. 1A also illustrates the intensity of first 210a and second 220a modulated illumination provided, respectively, by first and second light emitters. The first and second light emitters could be positioned, in an environment, to provide illumination to respective portions of the environment. For example, the first light emitter could be positioned to expose a person or some other target area to illumination.

The capture periods 205a have a uniform duration, $T_{CAPTURE}$, and the beginning of the capture periods 205a are separated regularly in time by a uniform duration, $PER_{CAPTURE}$. The first modulated illumination 210a includes pulses of illumination having duration $T_{ILLUM,1}$ that repeat in time with the capture periods 205a offset by an offset $T_{DELAY,1}$. In the illustrated example, $T_{DELAY,1}$ is approximately zero (that is, there is substantially no delay between to beginning of the capture periods 205a and the beginning of pulses of the first modulated illumination 210a). The second modulated illumination 210b includes pulses of illumination having duration $T_{ILLUM,2}$ that repeat in time with the capture periods 205a and that are offset by an offset $T_{DELAY2}$. In the example shown in FIG. 2A, the first modulated illumination is provided across the entirely of each of the capture periods 205a and the second modulated illumination is not provided during any of the capture periods 205a. Thus, if the first and second light emitters are the only sources of illumination in an environment imaged by the camera, the camera will, during the capture periods 205a, generate images wherein portions of the environment exposed to the first modulated illumination (e.g., a person or other target area) are illuminated while portions of the environment exposed only to the second modulated illumination are not illuminated.

As shown in FIG. 2A, the intensity of the first 210a and second 220a modulated illumination varies between 'on' and 'off' states according to regularly repeating pulses having a duty cycle (that is, a percentage of time 'on') of 50%. However, modulated illumination may be provided according to some other pattern or timing. For example, a duty cycle, pulse timing, 'on' or 'off' period intensity, or other properties of the modulated illumination could be specified such that the mean intensity of the provided illumination corresponds to some specified value or such that the modulated illumination satisfies some other consideration. For example, the first modulated illumination and second modulated illumination could have respective mean intensities that are within 15% of each other or that are otherwise substantially the same such that the intensity of the modulated illumination, as perceived by most people, is the same. Further, the intensity of the 'on' and 'off' states could each be non-zero (that is, the 'on' and 'off' could correspond to respective higher and lower non-zero intensities).

Sequential capture periods 205a are separated by delay periods 207a. A camera could, during the delay periods, read-out light-sensitive elements of the camera (e.g., read out charges accumulated by pixels of a charge coupled device of the camera) or perform some other operations. In some examples, the delay periods could be non-capture periods during which the camera does not capture images. Alternatively, the camera could capture further images during the delay periods 207a. Such images could be used, e.g., to set a color, timing, mean intensity, capture-period intensity, or other properties of modulated illumination (e.g., 210a, 220a) provided to the environment imaged by the camera. Additionally or alternatively, the camera could be operated, during respective different sets of capture periods, to capture respective pluralities of images of respective different target areas within an environment.

For example, a first person could be imaged, during the illustrated capture periods 205a, by the camera. The timing or other properties of the first and second modulated illumination 210a, 220a could be controlled to facilitate this imaging by, during the capture periods 205a, providing additional illumination to the first person and reducing the amount of illumination provided to other portions of the environment. A second person could also be imaged, using the camera, during further capture periods (not shown). The further capture periods could wholly or partially overlap with the delay periods 207a. Modulated illumination could be provided to the second person and/or to other portions of the environment (e.g., to the first person) to facilitate imaging of the second person during the further capture periods. This could include providing the illustrated modulated illumination 210a, 220a via the first and second light emitters or could include operating additional or alternative light emitters.

Modulated illumination can be provided to illuminate a target area during the entirety of each capture period of a camera and/or to provide no illumination to non-target areas of an environment during such capture periods. This is illustrated by way of example in FIG. 2A by the complete overlap of each capture period 205a by pulses of the first modulated illumination 210a and by the lack of any overlap of any capture period 205a by a pulse of the second modulated illumination 220a. However, other patterns and amounts of illumination of a person or other target areas of an environment and/or of background elements of the environment may be provided.

Indeed, it could be beneficial to decrease an amount of illumination provided to a person when imaged by a camera (e.g., to reduce glare from the skin of the person) and/or to increase the amount of illumination provided to a background of the person when imaging the person (e.g., to provide information about the location of the person). The timing, relative phase, pulse width, or other properties of the modulated illumination could be controlled to adjust the overall amount of illumination provided to elements of the environment when imaging the environment. These adjustments could be performed manually (e.g., by a person adjusting a control or operating a user interface) or automatically (e.g., by a controller, based on images generated by the camera, to set a brightness, a color balance, or some other property of images generated by the camera).

Figure 2B:
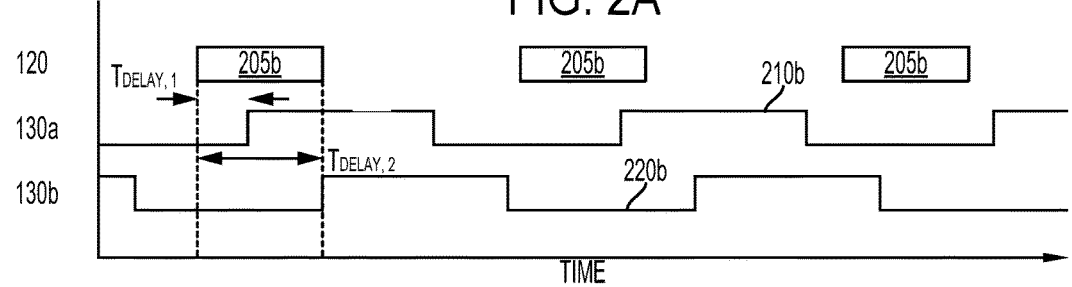
FIG. 2B is an example timing diagram of operation of a camera and two light emitters.

This is illustrated by way of example in FIG. 2B. FIG. 2B illustrates the timing of capture periods 205b of the camera and the intensity of first 210b and second 220b modulated illumination provided, respectively, by the first and second light emitters. The relative timing ($T_{DELAY,1}$) between the pulses of the first modulated illumination 210b and the capture periods 205b has been altered to reduce the overlap of the pulses of the first modulated illumination 210b with the capture periods 205b. Thus, the brightness of a target area or other portions of the environment exposed to the first modulated illumination 210b, when imaged during the capture periods 205b, may be decreased. Alternatively, a width of the pulses of the first modulated illumination, a waveform of the first modulated illumination, an 'on' intensity or an 'off' intensity of the first modulated illumination, or some other properties of the first modulated illumination could be changed to effect such a change and/or to satisfy some other consideration.

Figure 2C:
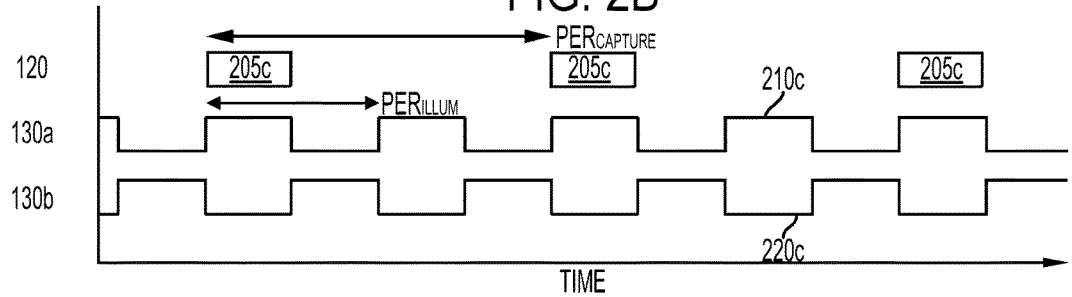
FIG. 2C is an example timing diagram of operation of a camera and two light emitters.

It could be beneficial to modulate provided illumination at a sufficiently high rate and/or bandwidth that the majority of humans are unable to perceive that the illumination is varying over time and/or to prevent the majority of humans from experiencing some other effects (e.g., nausea) due to the modulation of the illumination. However, a rate of image capture by a camera could be limited to a frequency that is less than that sufficiently high rate. In such examples, modulated illumination could be provided according to a repeating pattern of wavelength that repeats at a frequency that is an integer multiple of the frequency of image capture. Thus, the modulated illumination may be repeatedly varied at a frequency that is sufficiently high but may also be varied in time with capture periods of a camera to facilitate the functionality described herein This is illustrated by way of example in FIG. 2C. FIG. 2C illustrates the timing of capture periods 205c of the camera and the intensity of first 210c and second 220c modulated illumination provided, respectively, by the first and second light emitters. The period of repetition, $PER_{CAPTURE}$, of the capture periods 205c is an integer multiple of the period of repetition, $PER_{ILLUM}$, of the variation of the intensity of the modulated illumination 210c, 220c. Thus, the intensity of the modulated illumination varies over time at a frequency that is a multiple of the frequency at which the capture periods 205c occur. The multiple illustrated in FIG. 2C is two, but higher multiples are possible.

Further, the systems and operations described herein are not limited to capture of images and/or variation in the intensity of modulated illumination according to a regular rate. Images could be captured during capture periods that are not regularly spaced and/or that do not have a single, uniform duration. Correspondingly, modulated illumination provided to portions of an environment imaged according to such irregular capture periods could vary according to some irregular pattern such that the intensity of illumination provided to a particular portion of the environment is greater (or less) than the mean intensity of such provided illumination during the capture periods.

Multiple cameras could be used to image respective different people or other target areas of an environment. Such multiple targets could be exposed to modulated illumination from respective different light emitters, and be imaged during respective sets of capture periods, to improve the imaging of the multiple targets as described herein. This could include providing modulated illumination to the different targets such that the intensity of the illumination provided to a particular target is increased during capture periods when the particular target is being imaged. Conversely, illumination provided to non-target elements of the environment (e.g., to background elements that are imaged by multiple different cameras) could be reduced whenever one or more of the multiple cameras are capturing an image.

Figure 2D:
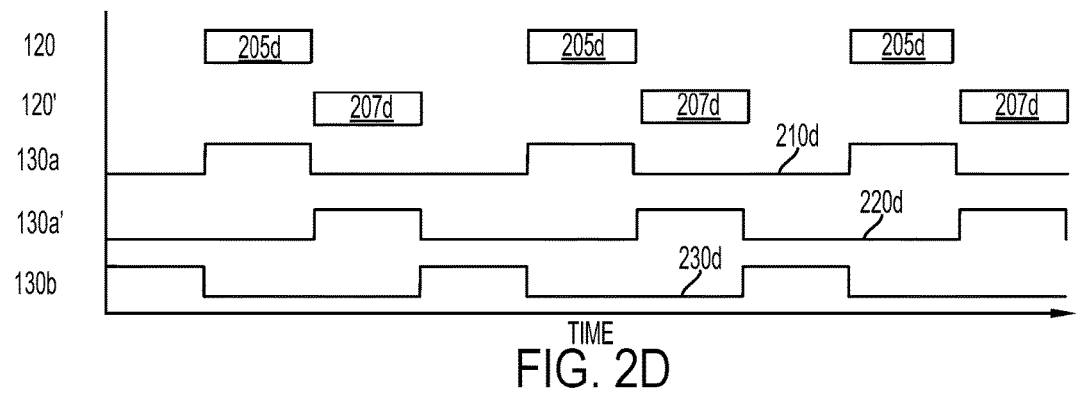
FIG. 2D is an example timing diagram of operation of a camera and two light emitters.

This is illustrated by way of example in FIG. 2D. FIG. 2D illustrates the timing of a first plurality of capture periods 205d of a first camera and a second plurality of capture periods 207d of a second camera 120'. FIG. 2D also shows the intensity of first modulated illumination 210d, to which a target area of the first camera is exposed and the intensity of second modulated illumination 220d, to which a target area of the second camera is exposed (e.g., from a further light emitter 130a'). The intensity of third modulated illumination 230d, which may be applied to other portions of the environment imaged by the first and second cameras (e.g., to walls or other background elements of the environment) is also shown. The intensity of the first modulated illumination 210d increases during the first capture periods 205d and the intensity of the second modulated illumination 220d increases during the second capture periods 207d. Conversely, the intensity of the third modulated illumination 230d increases during periods of time that are non-overlapping with either of the first 205d or second 207d capture periods.

Additional cameras and/or additional light emitters could be operated to provide the functionality described herein. In some examples, a set of light emitters could be operated to provide modulated illumination of a person or other portions of an environment. One or more of the set of light emitters could be selected and used to illuminate a target area of a camera in time with image capture by the camera. For example, each overhead light of a conference room could be operable to provide modulated illumination. The light emitter above a speaker in the conference room could be operated to provide modulated illumination in time with image capture of the speaker by a camera. One or more other light emitters in the room (e.g., light emitters providing light to portions of the conference room in the background of the speaker, from the point of view of the camera) could be operated to provide further modulated illumination, e.g., to reduce the brightness of background elements of the conference room when imaged by the camera.

Selection of one or more light emitters, from a set of light emitters, to provide modulated illumination could be performed in a variety of ways. In some examples, one or more light emitters could be selected manually, or according to the location of a target area relative to each light emitter of the set. For example, when the target area is a particular seat at a table in a conference room (e.g., due to a speaker occupying the seat), a light emitter above the seat could be selected to provide modulated illumination that has an increased intensity when images are captured of the particular seat. Additionally or alternatively, the light emitters and camera(s) could be operated to determine which light emitters to select and/or how to operate such selected light emitters. This could be beneficial in circumstances where the configuration of the light emitters and camera(s) in a room changes and/or is not known ahead of time, where the location of a target of a camera and/or of the camera itself is variable (e.g., when using a camera that is on a gimbal, when the camera is in a portable device), or some other circumstances.

The light emitters and camera(s) could be operated in a variety of ways to determine which light emitters to select and/or how to operate such selected light emitters. For example, each of the light emitters could be operated, during a respective test period, to provide illumination. One or more images could be captured using a camera during each of the test periods, and the captured images could be used to determine the contribution of each of the light emitters to portions of the environment that are visible to the camera. Based on this information, one or more of the light emitters could be selected to provide illumination to a target area of the camera and/or to other areas of the environment in time with image capture by the camera.

The systems and operations described herein could be beneficially applied to videoconferencing. In such examples, a person is imaged by a camera and a video stream or other information (e.g., an audio stream) is sent to one or more other participants in the videoconference. Additionally, video of the other videoconference participant(s) may be presented, via a display, to the person. As the person is looking toward the display, it could be beneficial to use the camera to image the person by way of the display. The camera could be disposed behind or within the display and could receive image light from the environment (e.g., form the person) through a hole or other formed channel through one or more elements (e.g., through an array of pixels, a backplane, a light spreader, a polarizing filter) of the display. Additionally or alternatively, the camera could receive image light through polarization filters, interconnects, thin films, or other transparent or functionally transparent materials of the display.

Figure 3:
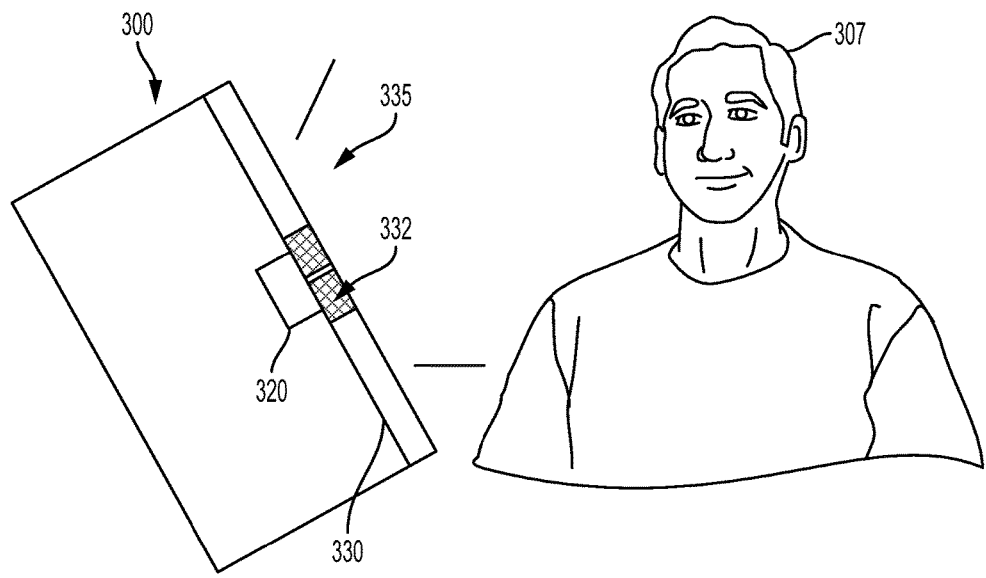
FIG. 3 is a diagram of an example system that can illuminate and capture images of a target.

FIG. 3 shows an example of such a system 300. The system 300 includes a display 330 that can be operated to emit light 335. The system 300 also includes a camera 320 that can be operated to capture images of an environment of the device 300 by way of the display 330. For example, the camera 320 could be operated to capture images of a person 307 that is viewing the display 330. The emitted light 335 can be image light used to provide an image. To facilitate imaging the person 307, such image light could be provided during image periods that are non-overlapping with capture periods during which when the camera 320 generates images of the person 307.

The display 330 could be operated to provide illumination to the person 307 to facilitate image capture by the camera 320. For example, the display 330 could be operated to provide, during specified capture periods, white light from all or a portion of the light-emitting area of the display 330. To reduce interference between such provide illumination and image light being received by the camera 320, a portion 332 of the light-emitting area of the display 330 might not emit illumination during the capture periods. The illumination provided by the display could be modulated as described herein to facilitate imaging of the person 307, e.g., by having an intensity that is greater during image capture periods than the mean intensity of the illumination across capture and non-capture (e.g., delay) periods.

Illumination provided to an environment (e.g., as modulated illumination) could be white light or could have some other specified spectral content. The spectral content (e.g., center wavelength or intensity at one or more wavelengths) of illumination provided to an environment could be controllable in order to control a white balance or other properties of images captured of the environment or to provide some other functionality. This could be accomplished by providing illumination at multiple different wavelengths from respective different light emitting elements (e.g., LEDs) of a light emitter. The intensity, pulse width, pulse timing, or other properties of modulated illumination provide form each of the light emitting elements could be specified to control the spectrum of the illumination used to image the environment.

Figure 4:
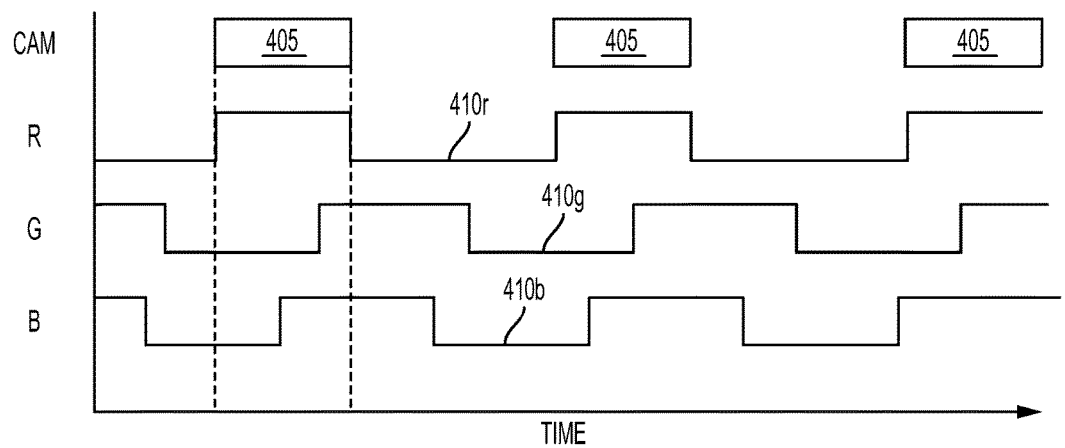
FIG. 4 is an example timing diagram of operation of a camera and three light emitters

This is illustrated by way of example in FIG. 4. FIG. 4 illustrates the timing of a plurality of capture periods 405 of a camera and the intensity of modulated illumination provided, at red, green, blue wavelengths, to a target area of the camera. FIG. 4 shows the timing of pulses of provided red modulated illumination 410r, green modulated illumination 410g, and blue modulated illumination 410b. The intensity of the modulated illumination provided at a particular wavelength could increase (or decrease) during the capture periods to increase (or decrease) an amount of light at the particular wavelength that is provided to capture images of a target area that is exposed to the modulated illumination. As shown in FIG. 4, such a target illumination receives, during the capture periods 405, twice as much red illumination as blue illumination and four times as much red illumination as green illumination. The specifics of the provided modulated illumination (e.g., the phase of the modulated illumination at each wavelength relative to the capture periods 405) could be controlled manually to affect a white balance or other properties of images generated during the capture periods 405. Additionally or alternatively, images captured by the camera could be used to automatically adjust the modulated illumination, e.g., to achieve a specified white balance in images captured using the camera.

As shown in FIG. 4, the duty cycle of the pulses of modulated illumination at each wavelength are substantially the same. However, the duty cycle or other properties of such modulated illumination (e.g., a frequency, an 'on' intensity, an 'off' intensity, a repeating pattern of the intensity of the modulated illumination) could be specified to control the color of the illumination as perceived by a human being.

III. EXAMPLE ELECTRONICS OF AN ILLUMINATION SYSTEM

Figure 5:
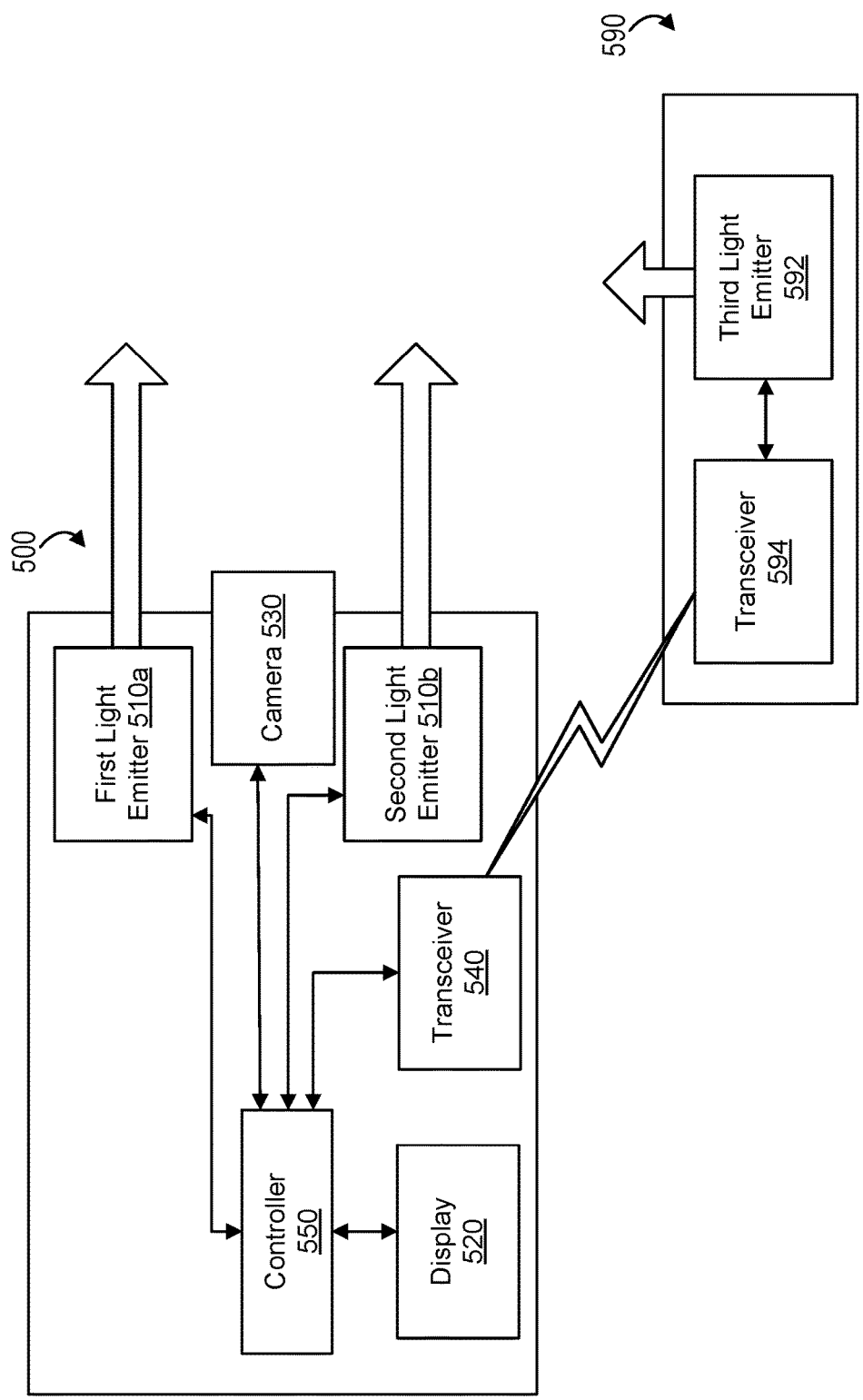
FIG. 5 is a block diagram of an example system that includes multiple light emitters.

FIG. 5 is a block diagram that includes a system 500 for providing modulated illumination to portions of an environment using one or more light emitters, capturing images of the illuminated environment, and for performing additional operations related to the image capture and illumination. FIG. 5 further illustrates a remote device 590 that may receive commands or other transmissions from the system 500 and, in response to such transmissions, modulate the intensity of illumination provided by a third light emitter 592 of the remote device 590.

The system 500 includes first 510a and second 510b light emitters that are configured to provide modulated illumination to an environment. The first light emitter 510a is configured to provide modulated illumination to a target area within a first portion of the environment (e.g., to a person participating in a videoconference) and the second light emitter 510b is configured to provide modulated illumination to a second portion of the environment (e.g., to an area behind or in the background of the person participating in the videoconference). The system 500 also includes a camera 530 configured to capture images (e.g., to capture images at a sufficiently high rate to generate video) of the environment. In particular, the camera 530 can capture images of the target area. The camera 530 can be operated to capture a plurality of images during respective capture periods, and the light emitters 510a, 510b can be operated to facilitate image capture by the camera 530. This could include providing modulated illumination as described elsewhere herein, e.g., to increase the intensity of illumination provided to the target of the camera during the capture periods and to decrease the intensity of the illumination provided to other portions of the environment during the capture periods. The system 500 further includes a controller 550, a transceiver 540 (e.g., an Ethernet interface, a WiFi radio, a Bluetooth radio, a cellular data radio) and a display 520 (e.g., a projector, a monitor).

The system 500 could be configured as a server, a desktop computer, a videoconferencing or presentation system, or some other type of system. Elements of the system 500 could be located proximate to each other (e.g., the light emitters 510a, 510b, controller 550, display 520, camera 530, and transceiver 540 could be located in a single room and connected via wired or wireless interconnects). Additionally or alternatively, one or more elements of the system 500 could be located at a distance from each other. For example, the controller 550 could be implemented as a server or as an application or process being executed in a cloud computing system and the controller 550 could be in communication with other elements of the system via Ethernet, a router, the internet, or some other wired or wireless interconnects.

Note that, while the system 500 is illustrated as including a display 520, camera 530, and two light emitters 510a, 510b, a system as described herein could include more or fewer of the illustrated elements and/or could include further elements not shown in FIG. 5. For example, the system 500 could include further light emitters. Alternatively, the system 500 could include no light emitters or cameras and could instead operate to cause one or more cameras, light emitters, or other components of other devices or systems (e.g., of remote device(s) 590) to capture images of an environment during capture periods and to provide modulated illumination to one or more portions of the environment in time with the capture periods. Causing a camera and/or light emitter to operate in such a way could include transmitting instructions to the camera and/or light emitter, transmitting another signal (e.g., a radio frequency signal or another optical signals that could be received by the transceiver 594 and transduced into an intensity or other property of illumination emitted from the third light emitter 592) to a camera or light emitter, or performing some other operations to cause a camera to capture one or more images and/or a light emitter to provide modulated illumination in time with image capture of a camera.

In some examples, a system could include no central controller and a camera and two or more light emitters could operate in concert to provide the functionality described herein. This could include one of the cameras and/or light emitters acting as a master device to transmit instructions to other elements of the system to provide modulated illumination, to capture images, or to perform some other operations, in time with capture periods of the camera. In another example, one or more light emitters could operate to provide modulate illumination to an environment and a camera device could detect the presence and timing of the modulated illumination and could operate to capture images in time with the modulate illumination (e.g., to capture images when the intensity of the illumination is increased above some mean level). Such a camera device could operate a camera or other image-forming component to detect the time-varying intensity of illumination to which the camera device is exposed; additionally or alternatively, the camera device could operate some other light-sensitive elements to perform this detection.

The controller 550 of the system 500 is configured to operate the light emitters 510a, 510b, camera 530, transceiver 540, and other elements of the system 500 (e.g., the display 520) and/or of other systems in communication with the system 500 (e.g., the third light emitter 392 of the remote device 590) to provide the some or all of the operations described herein. The controller 550 could include one or more microcontrollers, servers, cloud computing systems, or other components configured to perform operations described herein. The controller 550 could include elements configured to perform such actions based on program instructions or other information contained within a computer readable medium, e.g., to cause a light emitter to provide modulated illumination to a portion of an environment, to select such a light emitter from a set of light emitters, to capture a plurality of images using the camera 530, to compress or otherwise process images captured by the camera 530 to generate a video stream, to facilitate a videoconference (e.g., by transmitting a video stream, by receiving a video stream and presenting the received video stream using the display 520), or to perform some other actions.

The remote device 590 includes a third light emitter 592 and a transceiver 594. The transceiver can receive instructions from the controller 550 of the system 500. The third light emitter 592 is configured to provide modulated illumination as described elsewhere herein. The remote device 590 could be configured as a drop-in element designed to mount into a ceiling fixture, wall-mounted fixture, lamp, or other standard lighting fixture and to communicate with wired or wireless means with the system 500. Such communications could include indications of a pattern, intensity, timing, waveform, frequency of repetition, or other properties of modulated illumination that the remote device 590 could provide to a portion of an environment.

It is noted that the block diagram shown in FIG. 5 is described in connection with functional modules for convenience in description. However, embodiments of the system 500 and/or remote device 590 can be arranged with one or more of the functional modules ("sub-systems") implemented in a single integrated circuit (e.g., an integrated circuit that includes a light detector and circuitry for detecting an intensity of light received via the light detector, an integrated circuit that includes a controller and LED-driving circuitry of a light emitter), multiple integrated circuits or electronic assemblies (e.g., printed circuits boards with electronic components disposed thereon), or according to some other consideration.

IV. EXAMPLE METHODS

Figure 6:
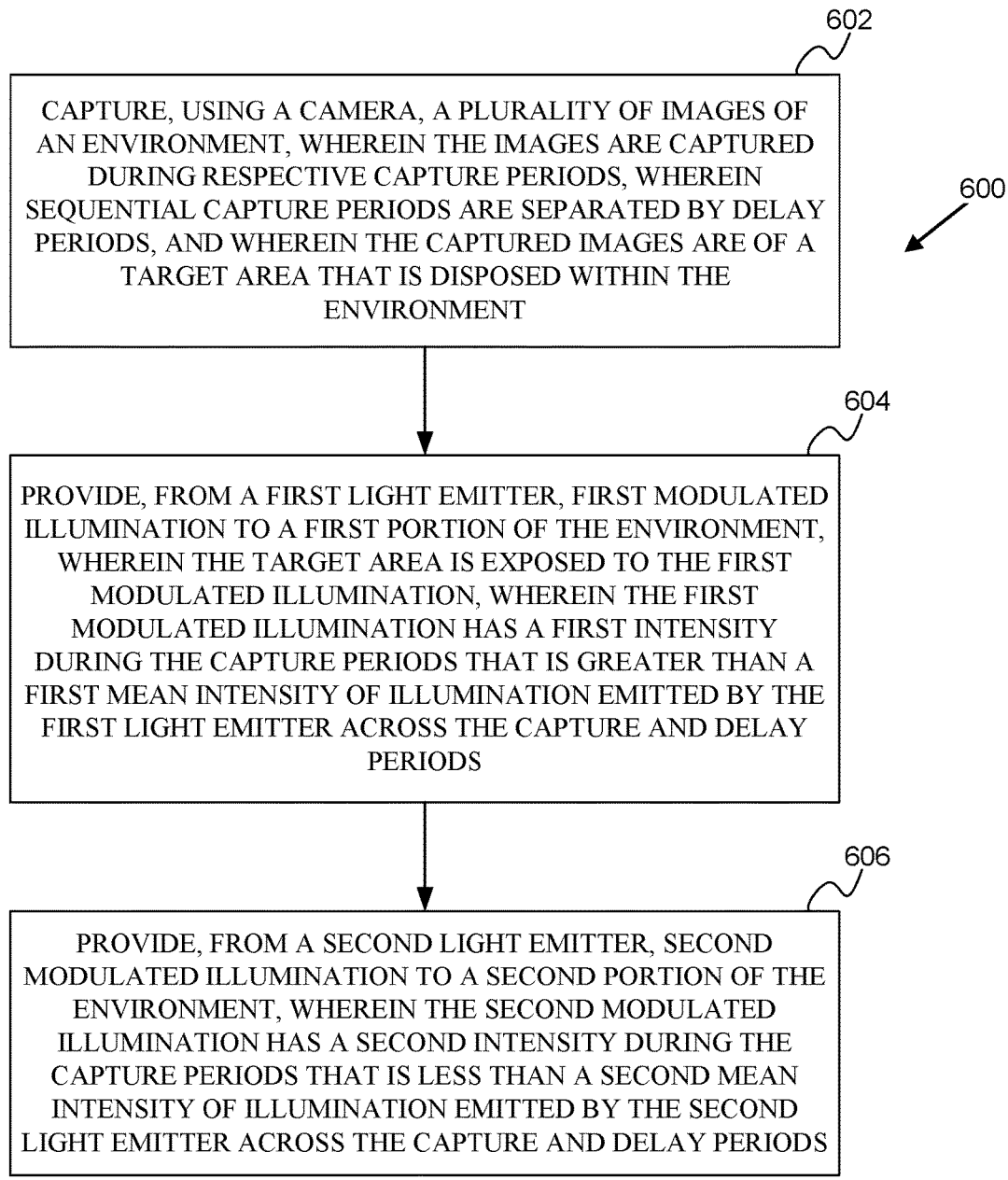
FIG. 6 is a flowchart of an example process.

FIG. 6 is a flowchart of a method 600 for operating a camera and light emitters to illuminate and image an environment. The method 600 includes capturing, using a camera, a plurality of images of an environment, wherein the images are captured during respective capture periods, wherein sequential capture periods are separated by delay periods, and wherein the captured images are of a target area that is disposed within the environment (602). This could include capturing a single image during each of the capture periods, taking multiple images during each capture period, or capturing images according to some other pattern. The capture periods could occur with a regular spacing in time and could have a uniform duration or the capture periods could have some other timing. Image capture could include operating a mechanical or electrical shutter of the camera. For example, image capture could include operating a charge coupled device using a global shutter to generate each of the captured images. Capturing the images (602) could include operating the camera directly (e.g., by a controller supplying control voltages to components of the camera) or transmitting instructions to the camera. The captured images could be black-and-white or color images.

The method 600 further includes providing, from a first light emitter, first modulated illumination to a first portion of the environment, wherein the target area is exposed to the first modulated illumination, wherein the first modulated illumination has a first intensity during the capture periods that is greater than a first mean intensity of illumination emitted by the first light emitter across the capture and delay periods (604). The first light emitter could include a ceiling light, a wall light, a spot light, a display of a device (e.g., a computer monitor, a cellphone display), a light disposed on or proximate to a camera used to capture images, or some other light emitting device(s). Providing, from the first light emitter, first modulated illumination (604) could include controlling a width, timing, frequency, waveform, or some other properties of a plurality of pulses of illumination. The first modulated illumination could vary over time at a sufficiently high frequency (e.g., greater than 60 Hertz) that the modulated illumination appears to most people human to be consistent. The mean intensity of the provided illumination over time (e.g., across capture and non-capture periods) could correspond to a specified mean light level (e.g., a light level corresponding to a dimmer switch or other user interface).

The method 600 yet further includes providing, from a second light emitter, second modulated illumination to a second portion of the environment, wherein the second modulated illumination has a second intensity during the capture periods that is less than a second mean intensity of illumination emitted by the second light emitter across the capture and delay periods (606). Providing this second modulated illumination could include performing operations similar to those described elsewhere herein, e.g., in relation to providing, from the first light emitter, the first modulated illumination (604).

The method 600 could include additional or alternative steps. The method 600 could include operating additional light emitters to provide additional modulated illumination and/or operating additional cameras to capture images (e.g., during respective different and/or non-overlapping capture periods). The method 600 could include selecting the first and second (or more) light emitters from a set of light emitters, e.g., based on operating the light emitters and the camera to determine the contribution of illumination provided by each of the light emitters to the illumination of a person or other target of the camera and/or of other elements of an environment imaged by the camera. The method 600 could include generating a video stream based on images captured by the camera (e.g., by compressing, downsampling, filtering, or otherwise processing the images). The method 600 could include operating one or more displays, speakers, microphones, cameras, or other equipment, e.g., to facilitate a presentation, videoconference, or other applications. The method 600 could include further steps, or steps alternative to those listed here.

Figure 7:
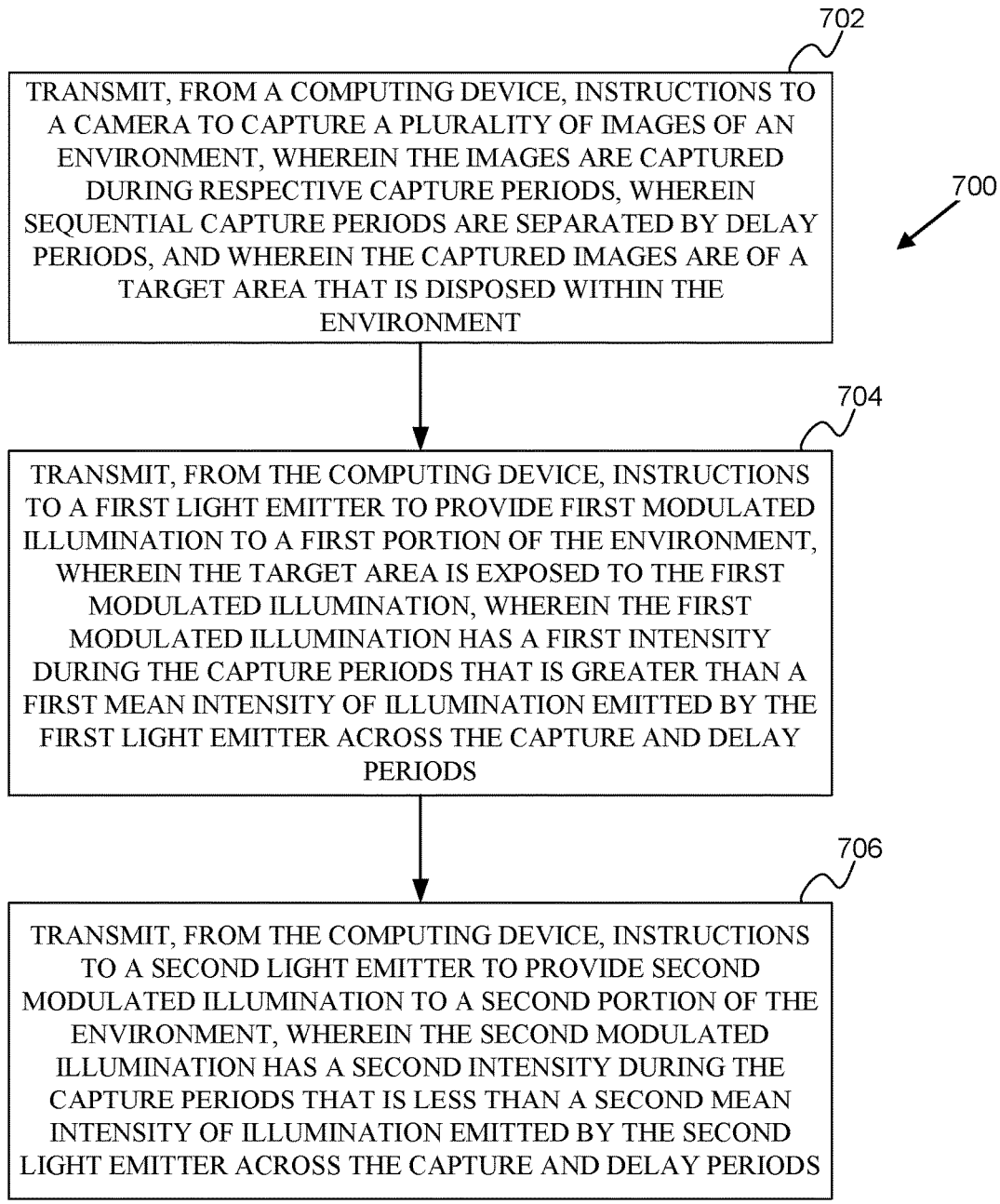
FIG. 7 is a flowchart of an example process.

FIG. 7 is a flowchart of a method 700 for operating a camera and light emitters to illuminate and image an environment. The method 700 includes transmitting, from a computing device, instructions to a camera to capture a plurality of images of an environment, wherein the images are captured during respective capture periods, wherein sequential capture periods are separated by delay periods, and wherein the captured images are of a target area that is disposed within the environment (702). The method 700 further includes transmitting, from the computing device, instructions to a first light emitter to provide first modulated illumination to a first portion of the environment, wherein the target area is exposed to the first modulated illumination, wherein the first modulated illumination has a first intensity during the capture periods that is greater than a first mean intensity of illumination emitted by the first light emitter across the capture and delay periods (704). The method 700 yet further includes transmitting, from the computing device, instructions to a second light emitter to provide second modulated illumination to a second portion of the environment, wherein the second modulated illumination has a second intensity during the capture periods that is less than a second mean intensity of illumination emitted by the second light emitter across the capture and delay periods (706). The method 700 could include additional or alternative steps as described elsewhere herein.

The computing device could be a computer, server, elements of a cloud computing service, a cellphone, or some other computing device. Transmitting instructions to a camera (702) and/or a light emitter (704, 706) could include transmitting information via wired and/or or wireless signals to the camera, e.g., via Ethernet, WiFi, Bluetooth, optical signals, acoustic signals, or some other signals. The information could be transmitted via the internet or some other network. The operations of the camera, responsive to receiving the instructions, could include performing operations similar to those described elsewhere herein, e.g., in relation to capturing, using a camera during a plurality of capture periods, a plurality of images of an environment (702). The operations of the light emitters, responsive to receiving the instructions, could include performing operations similar to those described elsewhere herein, e.g., in relation to providing modulated illumination to first (604) or second (606) portions of an environment.

Instructions transmitted during implementation of the method 700 (e.g., when performing steps 702, 704, and/or 706) could include information describing an absolute or relative timing of pulses of illumination and/or capture periods for one or more images. The instructions could specify the timing of particular capture periods and/or periods of illumination or could specify a frequency, phase, or other information about recurring capture periods. Transmitting such instructions could include transmitting the instructions once (e.g., transmitting commands to begin providing modulated illumination and/or to capture images) or could include transmitting instructions multiple times (e.g., generating a transmission for each capture period). Transmitting instructions to light emitters and/or cameras could include transmitting timing information sufficient to synchronize the operation of multiple systems (e.g., via clock synchronization, by transmitting timing pulses). Additionally or alternatively, transmitted instructions could reference timing information that is accessible by multiple different (e.g., absolute time provided by the global positioning system or a radio clock).

The methods 600, 700 or other operations described herein could be performed by one or more processors or other computational devices executing instructions stored in a computer readable medium. The instructions stored in the computer readable medium could include instructions that, when executed by a processor or other computational device, could result in the performance of all or part of any of the methods or other operations described herein. The computer readable medium containing the instructions could be part of a system that includes the computing device executing the instructions (e.g., a hard disk, solid state memory, RAM, ROM or other computer-readable memory storage of a computer, server, tablet, building automation controller, cell phone, or other device or system) or could be part of a system in communication with such a system (e.g., a cloud storage service, a network attached storage appliance, an app store accessible through the internet).

V. CONCLUSION

The particular arrangements shown in the figures should not be viewed as limiting. It should be understood that other embodiments may include more or less of each element shown in a given figure. Further, some of the illustrated elements may be combined or omitted. Yet further, an exemplary embodiment may include elements that are not illustrated in the figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A method comprising:
    capturing, using a camera, a plurality of images of an environment, wherein the images are captured during respective capture periods, wherein sequential capture periods are separated by delay periods, and wherein the captured images are of a target area that is disposed within the environment;
    providing, from a first light emitter, first modulated illumination to a first portion of the environment, wherein the target area is exposed to the first modulated illumination, wherein the first modulated illumination has a first intensity during the capture periods that is greater than a first mean intensity of illumination emitted by the first light emitter across the capture and delay periods; and
    providing, from a second light emitter, second modulated illumination to a second portion of the environment, wherein the second modulated illumination has a second intensity during the capture periods that is less than a second mean intensity of illumination emitted by the second light emitter across the capture and delay periods.

2. The method of claim 1, wherein the delay periods are non-capture periods in which the camera does not capture images.

3. The method of claim 1, further comprising:
    generating a video stream of the target area based on the images captured during the capture period.

4. The method of claim 1, wherein the first mean intensity and the second mean intensity differ by less than 15%.

5. The method of claim 1, wherein the capture periods occur at a first frequency, and wherein the intensity of the first modulated illumination varies over time at a second frequency that is a multiple of the first frequency.

6. The method of claim 1, further comprising:
    capturing, using a further camera, a plurality of further images of the environment, wherein the further images are captured during respective further capture periods, wherein sequential further capture periods are separated by further delay periods, and wherein the captured further images are of a further target area that is disposed within the environment;
    providing, from a third light emitter, third modulated illumination to a third portion of the environment, wherein the further target area is exposed to the third modulated illumination, wherein the third modulated illumination has a third intensity during the further capture periods that is greater than a third mean intensity of illumination emitted by the third light emitter across the further capture periods and further delay periods, and wherein the second modulated illumination has a fourth intensity during the further capture periods that is less than the second mean intensity.

7. The method of claim 1, wherein the first light emitter and the second light emitter are part of a set of three or more light emitters, wherein each of the light emitters of the set of light emitters is configured to provide illumination to a respective portion of the environment, and wherein the method further comprises:
    providing illumination from each light emitter of the set of three or more light emitters during a respective test period;
    capturing, using the camera, a plurality of test images of the environment, wherein at least one test image is captured during each of the test periods;
    selecting, based on the plurality of test images, the first light emitter from the set of light emitters; and selecting, based on the plurality of test images, the second light emitter from the set of light emitters.

8. A method comprising:

transmitting, from a computing device, instructions to a camera to capture a plurality of images of an environment, wherein the images are captured during respective capture periods, wherein sequential capture periods are separated by delay periods, and wherein the captured images include a target area that is disposed within the environment;

transmitting, from the computing device, instructions to a first light emitter to provide first modulated illumination to a first portion of the environment, wherein the target area is exposed to the first modulated illumination, wherein the first modulated illumination has a first intensity during the capture periods that is greater than a first mean intensity of illumination emitted by the first light emitter across the capture and delay periods; and transmitting, from the computing device, instructions to a second light emitter to provide second modulated illumination to a second portion of the environment, wherein the second modulated illumination has a second intensity during the capture periods that is less than a second mean intensity of illumination emitted by the second light emitter across the capture and delay periods.

9. The method of claim 8, further comprising:

receiving the images captured during the capture period; and generating a video stream of the target area based on the images captured during the capture period.

10. The method of claim 8, wherein the first mean intensity and the second mean intensity differ by less than 15%.

11. The method of claim 8, wherein the capture periods occur at a first frequency, and wherein the intensity of the first modulated illumination varies over time at a second frequency that is a multiple of the first frequency.

12. The method of claim 8, further comprising:

transmitting, from a computing device, instructions to a further camera to capture a plurality of further images of the environment, wherein the further images are captured during respective further capture periods, wherein sequential further capture periods are separated by further delay periods, and wherein the captured further images are of a further target area that is disposed within the environment;

transmitting, from a computing device, instructions to a third light emitter to provide third modulated illumination to a third portion of the environment, wherein the further target area is exposed to the third modulated illumination, wherein the third modulated illumination has a third intensity during the further capture periods that is greater than a third mean intensity of illumination emitted by the third light emitter across the further capture periods and further delay periods, and wherein the second modulated illumination has a fourth intensity during the further capture periods that is less than the second mean intensity.

13. A system comprising:

a camera configured to capture a plurality of images of an environment, wherein the images are captured during respective capture periods, wherein sequential capture periods are separated by delay periods, and wherein the captured images include a target area that is disposed within the environment;

a first light emitter configured to provide first modulated illumination to a first portion of the environment, wherein the target area is exposed to the first modulated illumination, wherein the first modulated illumination has a first intensity during the capture periods that is greater than a first mean intensity of illumination emitted by the first light emitter across the capture and delay periods; and a second light emitter configured to provide second modulated illumination to a second portion of the environment, wherein the second modulated illumination has a second intensity during the capture periods that is less than a second mean intensity of illumination emitted by the second light emitter across the capture and delay periods.

14. The system of claim 13, wherein the delay periods are non-capture periods in which the camera does not capture images.

15. The system of claim 13, further comprising a computing device programmed to:

receive the images captured during the capture period; and generate a video stream of the target area based on the images captured during the capture period.

16. The system of claim 13, wherein the first mean intensity and the second mean intensity differ by less than 15%.

17. The system of claim 13, wherein the capture periods occur at a first frequency, and wherein the intensity of the first modulated illumination varies over time at a second frequency that is a multiple of the first frequency.

18. The system of claim 13, further comprising a display configured to provide one or more images, wherein the camera captures images by way of the display, and wherein the one or more images are provided during one or more respective display periods that are non-overlapping with the capture periods.

19. The system of claim 13, further comprising:

a further camera configured to capture a plurality of further images of the environment, wherein the further images are captured during respective further capture periods, wherein sequential further capture periods are separated by further delay periods, and wherein the further captured images include a further target area that is disposed within the environment;

a third light emitter configured to provide third modulated illumination to a third portion of the environment, wherein the further target area is exposed to the third modulated illumination, wherein the third modulated illumination has a third intensity during the further capture periods that is greater than a third mean intensity of illumination emitted by the third light emitter across the further capture and further delay periods, and wherein the second modulated illumination has a fourth intensity during the further capture periods that is less than the second mean intensity.

20. The system of claim 13, further comprising a computing device programmed to transmit instructions to the first light emitter to provide the first modulated illumination and to transmit instructions to the second light emitter to provide the second modulated illumination.

* * * * *